United States Patent
Rosenquist et al.

(10) Patent No.: US 6,353,046 B1
(45) Date of Patent: Mar. 5, 2002

(54) FIRE-RETARDED POLYCARBONATE RESIN COMPOSITION

(75) Inventors: Niles Richard Rosenquist; Rajendra Kashinath Singh, both of Evansville, IN (US); Jeffrey Hayward Wengrovius, Scotia, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/560,770

(22) Filed: Apr. 28, 2000

(51) Int. Cl.[7] .................................. C08K 5/5435
(52) U.S. Cl. ................ 524/267; 524/261; 524/155; 524/157; 524/165; 524/166; 524/537
(58) Field of Search ................................ 524/261, 267, 524/155, 157, 165, 166, 537

(56) References Cited

U.S. PATENT DOCUMENTS

| | | |
|---|---|---|
| 3,030,331 A | 4/1962 | Goldberg |
| 3,169,121 A | 2/1965 | Goldberg |
| 3,775,367 A | 11/1973 | Nouvertne |
| 3,971,756 A | 7/1976 | Bialous et al. |
| 4,028,297 A | 6/1977 | Webb |
| 4,110,299 A | 8/1978 | Mark |
| 4,130,530 A | * 12/1978 | Mark et al. |
| 4,130,548 A | 12/1978 | Kochanowski |
| 4,286,083 A | 8/1981 | Kochanowski |
| 4,303,575 A | 12/1981 | Reinert |
| 4,317,944 A | 3/1982 | Davis |
| 4,335,038 A | 6/1982 | Thomas |
| 4,552,704 A | 11/1985 | Mark |
| 4,552,911 A | 11/1985 | Cohnen et al. |
| 4,916,194 A | 4/1990 | Policastro et al. |
| 5,084,527 A | 1/1992 | Yamamoto et al. |
| 5,210,268 A | 5/1993 | Fukuoka et al. |
| 5,218,027 A | 6/1993 | Smith et al. |
| 5,284,981 A | 2/1994 | Rudolph et al. |
| 5,315,042 A | 5/1994 | Cipullo et al. |
| 5,414,152 A | 5/1995 | Cipullo |
| 5,449,710 A | * 9/1995 | Umeda et al. |
| 5,463,140 A | 10/1995 | Wehmeyer et al. |
| 5,508,323 A | 4/1996 | Romenesko et al. |
| 5,606,007 A | 2/1997 | Sakashita et al. |
| 5,631,338 A | 5/1997 | Inoue et al. |
| 5,698,600 A | 12/1997 | Wulff et al. |
| 5,783,733 A | 7/1998 | Kissinger |
| 5,914,431 A | 6/1999 | Fennhoff |

FOREIGN PATENT DOCUMENTS

| | | |
|---|---|---|
| EP | 0 625 547 A1 | 11/1994 |
| EP | 0 918 073 A2 | 5/1999 |
| GB | 2019 422 | 10/1971 |
| JP | 002174567 | 5/1994 |
| JP | 06 128434 A | 5/1994 |
| JP | 06 306265 A | 11/1994 |
| JP | 002174566 | 10/2000 |
| JP | 2000 297214 A | 10/2000 |
| JP | 2000 327897 A | 11/2000 |

* cited by examiner

Primary Examiner—Robert Dawson
Assistant Examiner—Marc S. Zimmer
(74) Attorney, Agent, or Firm—Oppedahl & Larson LLP

(57) ABSTRACT

Improved fire-retarded properties can be imparted to polycarbonate resin composition by incorporating into the polycarbonate a fire-retardant component containing a perfluoroalkane sulfonate such as potassium perfluorobutane sulfonate and a cyclic siloxane such as octaphenylcyclotetrasiloxane. The fire-retardant component is suitably added at levels to form a polycarbonate composition in which the perfluoroalkane sulfonate is present in an amount of from 0.02 to 0.1 phr relative to the composition as a whole, and the cyclic siloxane is present in an amount of at least 0.02 relative to the composition as a whole.

55 Claims, No Drawings

FIRE-RETARDED POLYCARBONATE RESIN COMPOSITION

BACKGROUND OF THE INVENTION

This application relates to a fire-retarded polycarbonate resin composition.

Because of their strength and clarity, polycarbonate resins have a great many significant commercial applications. Unfortunately, polycarbonate resins are inherently flammable and can drip hot molten material causing nearby materials to catch fire as well. Thus, in order to safely utilize polycarbonates in many applications it is necessary to include additives which retard the flammability of the material and/or which reduce dripping. The challenge is to identify additives which accomplish this purpose without compromising the desirable properties of strength and clarity, without introducing new problems (such as the potential environmental problems associated with halogenated additives) and without prohibitively increasing the price.

A variety of different materials have been described for use in producing fire-retarded and/or drip-resistant polycarbonates. Exemplary of these are the materials described in U.S. Pat. Nos. 3,971,756, 4,028,297, 4,110,299, 4,130,530, 4,303,575, 4,335,038, 4,552,911, 4,916,194, 5,218,027 and 5,508,323. Notwithstanding these varied disclosures, however, there remains room for improvement in the formulation of fire-retarded polycarbonate resin.

Among the additives which are widely used commercially in fire-retarded polycarbonate resin compositions are organic salts, particularly sulfonic acid salts. Particular examples of these salts are perfluoroalkane sulfonates, such as potassium perfluorobutane sulfonate ("KPFBS", also known as "Rimar salt"). and potassium diphenylsulfone sulfonate ("KSS") yield haze free compositions when blended with polycarbonate resin. The use of perfluoroalkane sulfonates in polycarbonate resins is described in U.S. Pat. No. 3,775,367. However, the benefits which can be obtained using these materials alone are limited and indeed additional additives are generally included. The conventional means for enhancing the fire-retardant properties of these type of compositions while retaining transparency has been the addition of soluble organic halogen additives. For example, commercial grades of LEXAN polycarbonate resin (eg. 940A, 920A) contain a combination of KSS (0.3 phr) and a tetrabromobisphenol A/bisphenol A copolymer (0.5 phr, net 0.13 phr bromine content). Without the bromine, the 920A and 940A grades have inconsistent/unreliable performance in the UL94 VO 125 mil flammability test that these grades are designed to meet. However, the brominated additive is unsuitable for compositions which are required to meet "ECO-friendly" standards, since these standards prohibit the inclusion of bromine or chlorine.

SUMMARY OF THE INVENTION

It has now been found that improved fire-retarded properties can be imparted to polycarbonate resin composition by incorporating into the polycarbonate a fire-retardant component comprising a perfluoroalkane sulfonate, such as potassium perfluorobutane sulfonate, and a cyclic siloxane, such as octaphenylcyclotetrasiloxane. The fire-retardant component is suitably added at levels to form a polycarbonate composition in which the perfluoroalkane sulfonate is present in an amount of from 0.02 to 0.1 phr relative to the composition as a whole, and the cyclic siloxane is present in an amount of at least 0.02 relative to the composition as a whole.

DETAILED DESCRIPTION OF THE INVENTION

The present invention relates to fire-retarded compositions comprising polycarbonate resin. The polycarbonate component of the compositions may be of any grade and made by any method. Thus, for example, the polycarbonate may be made via interfacial processes or by catalytic transesterification. The polycarbonate may be either branched or linear in structure, and may include functional substituents. Polycarbonate copolymers are also included within the invention. Techniques for manufacture of polycarbonates by these processes are well known, for example from U.S. Pat. Nos. 3,030,331, 3,169,121, 4,130,548, 4,286,083, 4,552, 704, 5,210,268 and 5,606,007.

Once the polycarbonate resin is prepared, it is compounded with a fire-retardant component. In accordance with the invention, this fire retardant component comprises a perfluoroalkane sulfonate and a cyclic siloxane.

As noted above, perfluoroalkane sulfonates useful in the invention are described in U.S. Pat. No. 3,775,367. The most commonly employed of these materials is potassium perfluorobutane sulfonate which is commercially available from multiple sources. The perfluoroalkane sulfonate is included in the composition at a level sufficient to impart fire-retardant properties. In general, this will be in an amount of from 0.02 to 0.1 phr, based on the total weight of the composition. Amounts in excess of 0.1 phr may lead to haze in the compounded product, and do not lead to improved flame-retardant performance.

The cyclic siloxane is included in the composition at a level sufficient to impart improved fire-retardant properties in the presence of the perfluoroalkane sulfonate. In general, this will be in an amount of from 0.02 to 0.3 phr, based on the total weight of the composition. Suitable cyclic siloxanes which may be employed in the present invention include those with the general formula:

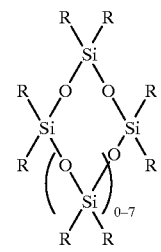

wherein R is independently selected from the group consisting of $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atoms, arylalkoxy of 7 to 36 carbon atoms, and $C_1$ to $C_{36}$ alkyl-substituted aryl of 6 to 14 carbon atoms. Specific examples of cyclic siloxanes include, but are not limited to: octaphenylcyclotetrasiloxane, hexamethylcyclotrisiloxane, octamethylcyclotetrasiloxane, decamethylcyclopentasiloxane, dodecamethylcyclohexasiloxane, trimethyltriphenylcyclotrisiloxane, and tetramethyltetraphenylcyclotetrasiloxane.

The perfluoroalkane sulfonate and cyclic siloxane are blended with molten polycarbonate, for example in a screw-type extruder, and extruded and molded into parts of desired shapes. They may be added to the polycarbonate in combination, for example as a fire-retardant additive composition comprising a perfluoroalkane sulfonate and a cyclic siloxane, or sequentially in either order. A fire-retardant composition in accordance with the invention suitably comprises the perfluoroalkane sulfonate and the cyclic siloxane in a ratio of from about 0.07 to 5 by weight.

For purposes of testing fire-retardant properties, bars were molded from extruded polycarbonate containing potassium perfluorobutane sulfonate and cyclic siloxane in varying amounts. These compositions were found to exhibit a substantial improvement in fire-retardant properties, as reflected in the examples set forth below. Although the mechanism of action is not understood, this result appears to arise from a synergistic interaction of the fire-retardant ingredients, since a similar improvement was not observed for combinations of KSS and the cyclic siloxane. In addition, although the small scale experiments reported herein did not show this conclusively, larger scale runs showed that use of the fire-retardant composition of the invention resulted in polycarbonate with reduced haze.

The compositions of the invention may include conventional additives which are known in the art for inclusion in polycarbonate compositions. Such additives include but are not limited to stabilizers, mold release agents, light stabilizers, heat stabilizers, pigments and dyes.

The invention will now be further described by way of the following, non-limiting examples.

EXAMPLE 1

Polycarbonate samples for flammability testing in accordance with the UL94 procedure were prepared by blending two different molecular weight grades of linear LEXAN® polycarbonate resin so as to achieve a target melt flow of 15 to 16, as measured at 300° C., 1.2 kg by ASTM D1238. Some compositions also included 0.35 phr of pentaerythritol tetrastearate (PETS) mold release. The powder blend samples were extruded at a temperature profile of 230 to 290° C. and cut into pellets. The pellet samples were injection molded at a temperature of 295° C. into test parts with dimensions 5 inches×½inch, with thickness of 125 mils.

Parts were tested using the standard Underwriters Laboratory UL 94 test method (2 day conditioning method), except that 20 bars rather than the usual 5 bars were tested. The data was analyzed first by calculation of the average flame out time (avFOTsec), standard deviation of the flame out time (sdFOTsec) and the total number of drips, and using statistical methods to convert that data to a prediction of the probability of first time pass, or "p(FTP)" that a particular sample formulation would achieve a VO "pass" rating in the conventional UL94 testing of 5 bar. Preferably p(FTP) will be as close to 1 as possible for maximum flame-retardant performance in UL Testing.

Pellet samples were also molded into test parts with dimensions 2 inches×3 inches×125 mil. These parts were used for haze measurements using the ASTM-D1003 test method.

The results of these experiments are summarized in Tables 1A–D. As shown, formulations in accordance with the invention which include both potassium perfluorobutane sulfonate and a cyclic siloxane (octaphenylcyclictetrasiloxane) have a probability of a first time pass "p(FTP)" which is at least several times higher than that observed using the potassium perfluorobutane sulfonate alone. Experiments performed using only the cyclic siloxane showed little if any improvement in fire-retardant properties. Corresponding experiments using KSS and cyclic siloxane did not show an enhancement of the fire-retardant performance.

Comparison compositoins were prepared with the same formulations, except that no KPFDS was included. Siloxane levels in these comparative compositions were 0.05, 0.1, 0.2, 1.0 and 2.0 phr. All of the comparison samples failed the UL94 VO test.

TABLE 1A

| | | | | | | |
|---|---|---|---|---|---|---|
| KPFBS, 3M (phr) | 0.05 | 0.06 | 0.07 | 0.05 | 0.06 | 0.07 |
| siloxane (phr) | — | — | — | 0.05 | 0.05 | 0.05 |
| p(FTP) UL 94 V0 125 mil | 0.1737 | 0.0483 | 0.0999 | 0.2102 | 0.2547 | 0.4163 |
| % haze | 0.7 | 0.8 | 0.4 | 0.8 | 0.5 | 0.5 |
| avFOTsec | 4.1 | 5.8 | 2.5 | 4.1 | 4.3 | 3.5 |
| sdFOTsec | 3.3 | 6.3 | 2.2 | 3.3 | 3.9 | 2.4 |
| drips | 2 | 0 | 6 | 2 | 0 | 2 |
| melt flow | 15.2 | 15.8 | 16.0 | 16.0 | 15.7 | 15.1 |

TABLE 1B

| | | | | | | |
|---|---|---|---|---|---|---|
| KPFBS, 3M (phr) | 0.05 | 0.06 | 0.07 | | | |
| KPFBS, Bayer (phr) | | | | 0.05 | 0.06 | 0.07 |
| siloxane (phr) | 0.1 | 0.1 | 0.1 | 0.1 | 0.1 | 0.1 |
| p(FTP) UL 94 v0 125 mil | 0.547 | 0.7512 | 0.9984 | 0.218 | 0.7921 | 0.9165 |
| % haze | 0.7 | 0.6 | 0.5 | 1 | 0.6 | 0.9 |
| avFOTsec | 3.5 | 2.9 | 1.8 | 2.9 | 2.9 | 2.2 |
| sdFOTsec | 2.8 | 2.4 | 0.9 | 2.5 | 2.2 | 2.5 |
| drips | 0 | 0 | 0 | 4 | 0 | 0 |
| melt flow | 16.3 | 16.0 | 15.5 | 16.0 | 15.6 | 15.6 |

TABLE 1C

| | | | | | | | | |
|---|---|---|---|---|---|---|---|---|
| KPFBS, Bayer (phr) | 0.07 | 0.08 | 0.09 | 0.1 | 0.07 | 0.08 | 0.09 | 0.1 |
| siloxane (phr) | — | — | — | — | 0.05 | 0.05 | 0.05 | 0.05 |
| PETS release (phr) | 0.35 | 0.35 | 0.35 | 0.35 | 0.35 | 0.35 | 0.35 | 0.35 |
| p(FTP) UL 94 V0 125 mil | 0.5825 | 0.4743 | 0.7692 | 0.8505 | 0.3686 | 0.8781 | 0.6852 | .906 |
| % haze | 0.9 | 0.1 | 0.6 | 1.5 | 0.3 | 0.7 | 1.3 | 2.1 |
| avFOTsec | 3.4 | 2.7 | 2.8 | 2.6 | 3.4 | 2.8 | 3.4 | 3.3 |
| sdFOTsec | 2.9 | 2.2 | 2 | 1.7 | 2.5 | 2 | 2.5 | 2.1 |
| drips | 0 | 2 | 0 | 0 | 2 | 0 | 0 | 0 |
| melt flow | 14.4 | 14.4 | 15.3 | 15.5 | 15.8 | 15.8 | 16.0 | 15.7 |

TABLE 1D

| KPFBS, Bayer (phr) | 0.07 | 0.08 | 0.09 | 0.1 | 0.07 | 0.08 | 0.09 | 0.1 |
|---|---|---|---|---|---|---|---|---|
| siloxane (phr) | 0.1 | 0.1 | 0.1 | 0.1 | 0.15 | 0.15 | 0.15 | 0.15 |
| PETS release (phr) | 0.35 | 0.35 | 0.35 | 0.35 | 0.35 | 0.35 | 0.35 | 0.35 |
| p(FTP) UL 94 V0 125 mil | 0.8656 | 0.9535 | 0.9959 | 0.9936 | 0.9405 | 0.9216 | 0.9753 | .9942 |
| % haze | 0.5 | 0.7 | 1 | 2.7 | 1.5 | 1 | 1.5 | 2.7 |
| avFOTsec | 2.6 | 2.4 | 2.1 | 1.7 | 2.4 | 2.5 | 2.1 | 2.2 |
| sdFOTsec | 1.9 | 1.6 | 1 | 1 | 1.8 | 1.7 | 1.2 | 1.1 |
| drips | 0 | 0 | 0 | 0 | 0 | 0 | 0 | 0 |
| melt flow | 15.8 | 15.6 | 14.6 | 15.3 | 15.7 | 16.0 | 16.6 | 16.4 |

EXAMPLE 2

Samples were prepared in an identical manner to those of Example 1 except that the polycarbonate resin used was a blend of 70 parts by weight of a branched polycarbonate resin containing 0.42 mole % 1,1,1 tris(hydroxyphenyl) ethane and 30 parts by weight of linear polycarbonate resin to achieve the target melt flow of 2 to 3 as measured at 300° C., 1.2 kg by ASTM-D1238. A UV stabilizer (UV5411, 2-(2-hydroxy-5-tert-octylphenyl)benzotriazole) was also included. Samples were extruded at 240 to 305 C and injection molded at 320 to 332 C into test parts with thickness of 60 mils, 75 mils and 125 mils. The formulations and results are summarized in Tables 2A and B. Comparable tests were conducted at 60 mils and 125 mils. 60 mil testing showed only marginal performance, and no trends for all samples containing KPFBS and drip failures for all samples without the KPFBS. 125 mil testing had p(FTP) of 0.9867 for the sample with 0.07 KPFBS. Other KPFBS containing samples were not tested due to passes at 75 mils. All samples without KPFBS had drip failures.

TABLE 2A

| KPFBS, Bayer (phr) | 0 | 0.07 | 0.08 | 0.09 | 0.07 | 0.08 | 0.09 |
|---|---|---|---|---|---|---|---|
| siloxane (phr) | — | — | — | — | 0.05 | 0.05 | 0.05 |
| UV stabilizer (phr) | 0.27 | 0.27 | 0.27 | 0.27 | 0.27 | 0.27 | 0.27 |
| p(FTP) UL 94 V0 75 mil | nd | 0.2125 | 0.9157 | 0.9054 | 0.9802 | 0.9218 | 0.9867 |
| % haze | 1 | 1.2 | 1.8 | 1.1 | 0.9 | 1.3 | 1.6 |
| avFOTsec | | 2.8 | 2.4 | 2.5 | 2.3 | 2.4 | 2.3 |
| sdFOTsec | | 2.1 | 1.7 | 1.9 | 1.4 | 1.8 | 1.3 |
| drips | 5 of 5 | 4 | 0 | 0 | 0 | 0 | 0 |
| melt flow | 2.65 | 2.4 | 2.4 | 2.65 | 2.23 | 2.23 | 2.82 |

TABLE 2B

| KPFBS, Bayer (phr) | 0.07 | 0.08 | 0.09 | 0 | 0 |
|---|---|---|---|---|---|
| siloxane (phr) | 0.1 | 0.1 | 0.1 | 0.05 | 0.1 |
| UV stabilizer (phr) | 0.27 | 0.27 | 0.27 | 0.27 | 0.27 |
| p(FTP) UL 94 V0 75 mils | 0.965 | 0.9509 | 0.9568 | nd | nd |
| % haze | 0.6 | 0.9 | 1.3 | 1 | 0.7 |
| avFOTsec | 2.4 | 2.4 | 2.5 | | |
| sdFOTsec | 1.5 | 1.6 | 1.6 | | |
| drips | 0 | 0 | 0 | 7 of 10 | 5 of 5 |
| melt flow | 2.50 | 2.35 | 2.39 | 2.98 | 3.03 |

What is claimed is:

1. A composition comprising polycarbonate resin, and a fire-retardant component comprising a perfluoroalkane sulfonate and a cyclic siloxane, wherein the cyclic siloxane has the general formula:

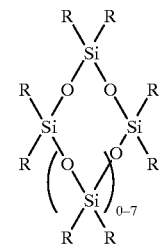

wherein R is independently selected from the group consisting of $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atoms, arylalkoxy of 7 to 36 carbon atoms, and $C_1$ to $C_{36}$ alkyl-substituted aryl of 6 to 14 carbon atoms.

2. The composition according to claim 1, wherein the perfluoroalkane sulfonate is present in an amount of from 0.02 to 0.1 phr relative to the composition as a whole, and the cyclic siloxane is present in an amount of at least 0.02 relative to the composition as a whole.

3. The composition according to claim 2, wherein the perfluoroalkane sulfonate is potassium perfluorobutane sulfonate.

4. The composition according to claim 1, wherein the perfluoroalkane sulfonate is potassium perfluorobutane sulfonate.

5. The composition according to claim 1, wherein the polycarbonate resin comprises a mixture of linear and branched polycarbonates.

6. A method for making a fire-retarded polycarbonate resin composition comprising the steps of compounding the resin with a fire-retardant component comprising a perfluoroalkane sulfonate and a cyclic siloxane, wherein the cyclic siloxane has the general formula:

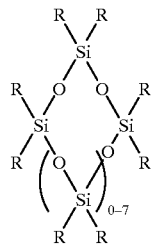

wherein R is independently selected from the group consisting of $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atoms, arylalkoxy of 7 to 36 carbon atoms, and $C_1$ to $C_{36}$ alkyl-substituted aryl of 6 to 14 carbon atoms.

7. The method according to claim 6, wherein the perfluoroalkane sulfonate is present in an amount of from 0.02 to 0.1 phr relative to the composition as a whole, and the cyclic siloxane is present in an amount of at least 0.02 phr relative to the composition as a whole.

8. The method according to claim 7, wherein the perfluoroalkane sulfonate is potassium perfluorobutane sulfonate.

9. The method according to claim 6, wherein the perfluoroalkane sulfonate is potassium perfluorobutane sulfonate.

10. The method according to claim 6, wherein the polycarbonate resin comprises a mixture of linear and branched polycarbonates.

11. A method for improving the fire-retarded properties of a polycarbonate resin composition comprising polycarbonate and a perfluoroalkane sulfonate, comprising adding to the composition a cyclic siloxane, wherein the cyclic siloxane has the general formula:

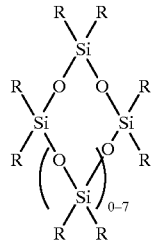

wherein R is independently selected from the group consisting of $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atoms, arylalkoxy of 7 to 36 carbon atoms, and $C_1$ to $C_{36}$ alkyl-substituted aryl of 6 to 14 carbon atoms.

12. The method according to claim 11, wherein the perfluoroalkane sulfonate is present in an amount of from 0.02 to 0.1 phr relative to the composition as a whole, and the cyclic siloxane is present in an amount of at least 0.02 phr relative to the composition as a whole.

13. The method according to claim 12, wherein the perfluoroalkane sulfonate is potassium perfluorobutane sulfonate.

14. The method according to claim 11, wherein the perfluoroalkane sulfonate is potassium perfluorobutane sulfonate.

15. The method according to claim 11, wherein the polycarbonate resin comprises a mixture of linear and branched polycarbonates.

16. A fire-retardant additive composition comprising a perfluoroalkane sulfonate and a cyclic siloxane, wherein the cyclic siloxane has the general formula:

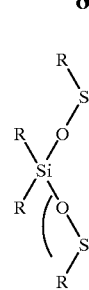

wherein R is independently selected from the group consisting of $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atoms, arylalkoxy of 7 to 36 carbon atoms, and $C_1$ to $C_{36}$ alkyl-substituted aryl of 6 to 14 carbon atoms.

17. The additive composition according to claim 16, wherein the perfluoroalkane sulfonate and a cyclic siloxane are present in a ratio of from 0.07 to 5 by weight.

18. The additive composition according to claim 17, wherein the perfluoroalkane sulfonate is potassium perfluorobutane sulfonate.

19. The additive composition according to claim 16, wherein the perfluoroalkane sulfonate is potassium perfluorobutane sulfonate.

20. A composition comprising polycarbonate resin, and a fire-retardant component comprising a perfluoroalkane sulfonate and a cyclic siloxane, wherein the cyclic siloxane has the general formula:

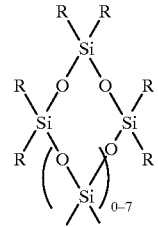

wherein R is the same and is selected from the group consisting of $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atom arylalkoxy of 7 to 36 carbon atoms, and $C_1$ to $C_{36}$ alkyl-substituted aryl of 6 to 14 carbon atoms.

21. The composition according to claim 20, wherein the perfluoroalkane sulfonate is present in an amount of from 0.02 to 0.1 phr relative to the composition as a whole, and the cyclic siloxane is present in an amount of at least 0.02 relative to the composition as a whole.

22. The composition according to claim 20, wherein the cyclic siloxane is hexamethylcyclotrisiloxane, octamethylcyclotetrasiloxane, decamethylcyclopentasiloxane, or dodecamethylcyclohexasiloxane.

23. The composition according to claim 20, wherein the cyclic siloxane is octaphenylcyclotetrasiloxane.

24. The composition according to claim 20, wherein the perfluoroalkane sulfonate is potassium perfluorobutane sulfonate.

25. The composition according to claim 24, wherein the cyclic siloxane is hexamethylcyclotrisiloxane, octamethylcyclotetrasiloxane, decamethylcyclopentasiloxane, or dodecamethylcyclohexasiloxane.

26. The composition according to claim 24, wherein the cyclic siloxane is octaphenylcyclotetrasiloxane.

27. A method for making a fire-retarded polycarbonate resin composition comprising the steps of compounding the resin with a fire-retardant component comprising a perfluoroalkane sulfonate and a cyclic siloxane, wherein the cyclic siloxane has the general formula:

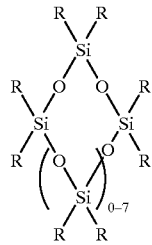

wherein R is the same and is selected from the group consisting of $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atoms, arylalkoxy of 7 to 36 carbon atoms, and $C_1$ to $C_{36}$ alkyl-substituted aryl of 6 to 14 carbon atoms.

28. The method according to claim 27, wherein the perfluoroalkane sulfonate is present in an amount of from 0.02 to 0.1 phr relative to the composition as a whole, and the cyclic siloxane is present in an amount of at least 0.02 phr relative to the composition as a whole.

29. The method according to claim 28, wherein the cyclic siloxane is hexamethylcyclotrisiloxane, octamethylcyclotetrasiloxane, decamethylcyclopentasiloxane, or dodecamethylcyclohexasiloxane.

30. The method according to claim 28, wherein the cyclic siloxane is octaphenylcyclotetrasiloxane.

31. The method according to claim 27, wherein the perfluoroalkane sulfonate is potassium perfluorobutane sulfonate.

32. The method according to claim 31, wherein the cyclic siloxane is hexamethylcyclotrisiloxane, octamethylcyclotetrasiloxane, decamethylcyclopentasiloxane, or dodecamethylcyclohexasiloxane.

33. The method according to claim 31, wherein the cyclic siloxane is octaphenylcyclotetrasiloxane.

34. The method according to claim 27, wherein the cyclic siloxane is hexamethylcyclotrisiloxane, octamethylcyclotetrasiloxane, decamethylcyclopentasiloxane, or dodecamethylcyclohexasiloxane.

35. The method according to claim 27, wherein the cyclic siloxane is octaphenylcyclotetrasiloxane.

36. The method according to claim 27, wherein the polycarbonate resin comprises a mixture of linear and branched polycarbonates.

37. A method for improving the fire-retarded properties of a polycarbonate resin composition comprising polycarbonate and a perfluoroalkane sulfonate, comprising adding to the composition a cyclic siloxane, wherein the cyclic siloxane has the general formula:

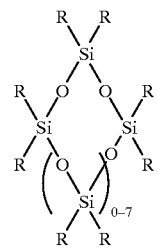

wherein R is the same and is selected from the group consisting of $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atoms, arylalkoxy of 7 to 36 carbon atoms, and $C_1$ to $C_{36}$ alkyl-substituted aryl of 6 to 14 carbon atoms.

38. The method according to claim 37, wherein the perfluoroalkane sulfonate is present in an amount of from 0.02 to 0.1 phr relative to the composition as a whole, and the cyclic siloxane is present in an amount of at least 0.02 phr relative to the composition as a whole.

39. The method according to claim 38, wherein the cyclic siloxane is hexamethylcyclotrisiloxane, octamethylcyclotetrasiloxane, decamethylcyclopentasiloxane, or dodecamethylcyclohexasiloxane.

40. The method according to claim 38, wherein the cyclic siloxane is octaphenylcyclotetrasiloxane.

41. The method according to claim 36, wherein the perfluoroalkane sulfonate is potassium perfluorobutane sulfonate.

42. The method according to claim 41, wherein the cyclic siloxane is hexamethylcyclotrisiloxane, octamethylcyclotetrasiloxane, decamethylcyclopentasiloxane, or dodecamethylcyclohexasiloxane.

43. The method according to claim 41, wherein the cyclic siloxane is octaphenylcyclotetrasiloxane.

44. The method according to claim 36, wherein the cyclic siloxane is hexamethylcyclotrisiloxane, octamethylcyclotetrasiloxane, decamethylcyclopentasiloxane, or dodecamethylcyclohexasiloxane.

45. The method according to claim 36, wherein the cyclic siloxane is octaphenylcyclotetrasiloxane.

46. The method according to claim 36, wherein the polycarbonate resin comprises a mixture of linear and branched polycarbonates.

47. A fire-retardant additive composition comprising a perfluoroalkane sulfonate and a cyclic siloxane, wherein the cyclic siloxane has the general formula:

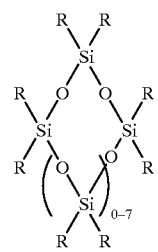

wherein R is the same and is selected from the group consisting of $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atoms, arylalkoxy of 7 to 36 carbon atoms, and $C_1$ to $C_{36}$ alkyl-substituted aryl of 6 to 14 carbon atoms.

48. The additive composition according to claim 47, wherein the perfluoroalkane sulfonate and a cyclic siloxane are present in a ratio of from 0.07 to 5 by weight.

49. The additive composition according to claim 48, wherein the cyclic siloxane is hexamethylcyclotrisiloxane, octamethylcyclotetrasiloxane, decamethylcyclopentasiloxane, or dodecamethylcyclohexasiloxane.

50. The additive composition according to claim 48, wherein the cyclic siloxane is octaphenylcyclotetrasiloxane.

51. The additive composition according to claim 47, wherein the perfluoroalkane sulfonate is potassium perfluorobutane sulfonate.

52. The additive composition according to claim 51, wherein the cyclic siloxane is hexamethylcyclotrisiloxane, octamethylcyclotetrasiloxane, decamethylcyclopentasiloxane, or dodecamethylcyclohexasiloxane.

53. The additive composition according to claim 51, wherein the cyclic siloxane is octaphenylcyclotetrasiloxane.

54. The additive composition according to claim 47, wherein the cyclic siloxane is hexamethylcyclotrisiloxane, octamethylcyclotetrasiloxane, decamethylcyclopentasiloxane, or dodecamethylcyclohexasiloxane.

55. The additive composition according to claim 47, wherein the cyclic siloxane is octaphenylcyclotetrasiloxane.

* * * * *